United States Patent
Engelke

(10) Patent No.: US 10,733,400 B2
(45) Date of Patent: Aug. 4, 2020

(54) DATA TRANSMISSION FROM AUTONOMOUS VEHICLE TO EXTERNAL HMI DEVICES

(71) Applicant: FORD GLOBAL TECHNOLOGIES, LLC, Dearborn, MI (US)

(72) Inventor: Maximilian Engelke, Aachen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/278,243

(22) Filed: Feb. 18, 2019

(65) Prior Publication Data

US 2019/0278959 A1    Sep. 12, 2019

(30) Foreign Application Priority Data

Mar. 12, 2018 (DE) .................... 10 2018 203 660

(51) Int. Cl.
| | | |
|---|---|---|
| *G06K 7/10* | (2006.01) | |
| *G06K 7/14* | (2006.01) | |
| *B60Q 1/50* | (2006.01) | |

(52) U.S. Cl.
CPC ........... *G06K 7/10712* (2013.01); *B60Q 1/50* (2013.01); *G06K 7/1413* (2013.01)

(58) Field of Classification Search
CPC ..... G06K 7/10712; G06K 7/1413; B60Q 1/50
USPC .......................... 235/462.41, 462.45, 472.01
See application file for complete search history.

(56) References Cited

U.S. PATENT DOCUMENTS

| | | |
|---|---|---|
| 9,165,310 B2 | 10/2015 | Liu et al. |
| 9,477,770 B2 | 10/2016 | Doss et al. |
| 2006/0063589 A1 | 3/2006 | Chong |
| 2009/0245047 A1 | 10/2009 | Hendriks et al. |
| 2016/0212613 A1 | 7/2016 | Huang |
| 2017/0187457 A1 | 6/2017 | Liu et al. |
| 2017/0213165 A1* | 7/2017 | Stauffer ................. G06Q 10/02 |

FOREIGN PATENT DOCUMENTS

CN        201435735 Y        3/2010

OTHER PUBLICATIONS

Pengju Fang et al., A Visible Light Communication Based Infra-to-Vehicle Intelligent Transport Demo System, 2015 International Conference on Connected Vehicles and Expo (ICCVE) ©2015 IEEE, pp. 140-141.

* cited by examiner

*Primary Examiner* — Paultep Savusdiphol
(74) *Attorney, Agent, or Firm* — Frank L. Lollo; MacMillan, Sobanski & Todd, LLC

(57) ABSTRACT

Ride-share status information of an autonomous ride-share vehicle is made available to potential passengers by transmitting a status data record an HMI device outside the vehicle. The data record (D') is projected onto a projection area selected outside the vehicle using a projection device (8) of the motor vehicle. The projected data record (D') is read-in using a reading device (10), such as a camera, of the HMI device. The HMI device decodes the read-in data record (D'), and provides the status information to a potential passenger on the HMI device (4) based on the decoded data record (D').

13 Claims, 3 Drawing Sheets

US 10,733,400 B2

DATA TRANSMISSION FROM AUTONOMOUS VEHICLE TO EXTERNAL HMI DEVICES

CROSS REFERENCE TO RELATED APPLICATIONS

This application claims priority to application DE102018203660.8, filed in the German Patent and Trademark Office on Mar. 12, 2018, which is incorporated herein by reference in its entirety.

STATEMENT REGARDING FEDERALLY SPONSORED RESEARCH

Not Applicable.

BACKGROUND OF THE INVENTION

The present invention relates in general to transmitting status data records from a motor vehicle to an HMI device outside the motor vehicle. Further, the invention relates to an HMI and a motor vehicle and to computer program products for the respective HMI and motor vehicle.

A self-driving motor vehicle (also known as an autonomous land vehicle) refers to automobiles or other motor vehicles that can drive, steer, and park without the influence of a human driver (i.e., highly automated or autonomous driving). If no kind of manual control by the driver is needed, the term robot car is also used. In that case, the driver's seat can remain empty, and possibly, the steering wheel, brake and accelerator pedals may not be present. The term "self-driving motor vehicle" in addition also covers trucks, agricultural tractors, and military vehicles without requiring the influence of the driver or without a driver at all.

Self-driving motor vehicles of this kind can compensate for some disadvantages with car sharing using conventional (non-self-driving) motor vehicles. In this context, car sharing is understood to mean the organized joint use of one or more motor vehicles by a plurality of users. As such, a motor vehicle can autonomously pick up a passenger at a predetermined destination and independently look for a parking space at the destination.

However, the case may also arise in which the motor vehicle—although without a passenger—is on the way to a predetermined destination in order to pick up another passenger. In other words, although the motor vehicle is empty, it is already booked for a journey.

It is therefore an object of the invention to demonstrate ways in which a motor vehicle of this kind can communicate with a potential passenger in order to exchange information about the booking status or other status of the ride-share vehicle.

SUMMARY OF THE INVENTION

In one aspect of the invention, important objects of the invention are achieved by a method for transmitting a status data record from a motor vehicle to an HMI device outside the motor vehicle, wherein a status data record is projected onto a projection area outside the motor vehicle using a projection device of the motor vehicle. The projected status data record is read using a reading device of the HMI device. The read-in data record is evaluated, and status information is provided on the HMI based on the evaluated data record.

Thus, information is made available to a potential passenger who is not in the passenger compartment of the motor vehicle, but rather outside the motor vehicle, by projecting a status data record.

In this case, the HMI device is associated with a possible passenger of the motor vehicle. An HMI is understood in this context to mean a Human Machine Interface used to bring the content of the transmitted data record to the attention of the pedestrian or potential passenger in human-readable form, e.g., in visual form as a text and/or symbol output or in audible form (e.g. signal tones and/or voice outputs). The HMI device may be a handheld device, for example. A handheld device is understood in this context to mean a portable electronic device supplied with power by storage batteries or batteries for different applications. It is typically small and light enough to be able to be held in just one hand during use. For example, the handheld device may be a smartphone or a tablet computer. Additionally, the HMI device may also be another type of mobile device.

The status data record is transmitted wirelessly. In one embodiment, the status data record can be projected using light in a visible wavelength range. This facilitates the orientation of the HMI for the potential passenger to read in the projected data record. Alternatively, UV or infrared light can also be used, in which case the projection is beneficially limited to within a predetermined range.

As such, it is a simple matter for a data record whose content is indicative of the booking status of the motor vehicle (e.g., whether the motor vehicle is already booked and is on the way to the predetermined destination in order to pick up a passenger) to be transmitted from the motor vehicle to the HMI device of the potential passenger.

According to one embodiment, the projection area used is a section of the ground. The section of ground is in a region between the motor vehicle and a passenger holding the HMI. This achieves particularly simple data transmission. Alternatively, other areas can also be used as projection areas such as walls, especially if the section of ground is not suitable as a projection area (e.g., it is a lawn or other textured area). A suitable projection area can be selected by evaluating ambient sensor data provided by ambient sensors of the motor vehicle, such as LIDAR or radar sensors, that scan the surroundings of the motor vehicle in order to provide surroundings data for autonomous control.

According to a further embodiment, a position data record representative of a position of the HMI device in relation to the motor vehicle is determined. In this regard, there may be provision for the motor vehicle to determine the position of the HMI by means of an evaluation unit. In this case, the evaluation unit can access the ambient sensor data already monitoring the environment to perform autonomous driving.

According to a further embodiment, a distance between the motor vehicle and the HMI device is determined by evaluating the position data record, and the status data record is only projected if the distance is less than a threshold value. This ensures that the status data record is projected only if the HMI device is sufficiently close to the motor vehicle, so that the projected data record can also be read in. The threshold value may be a predetermined fixed value, or it is matched to the detected surroundings. For example, the threshold value can be increased if the character of the detected surroundings ensures a clear view is present.

According to a further embodiment, a projection data record representative of the projection area is determined by evaluating the position data record. The projection data record defines the region of the projection area in the form of a set of coordinates. Expediently, the projection data record defines a projection area that is in a region between the motor vehicle and the HMI device.

According to a further embodiment, an encoding device of the motor vehicle encodes the status data record to be projected in machine-readable fashion and a decoding device of the HMI decodes the encoded and projected data record. The machine-readable encoding ensures that the projected data record does not become public (i.e., does not become readily accessible to anyone else). Additionally, there may be provision for the status data record to be encrypted before it is projected, e.g., by means of a public key encryption method. This allows data protection to be improved.

Further, the invention includes a motor vehicle and an HMI device and also computer program products for implementing the invention in a respective motor vehicle and HMI device.

DETAILED DESCRIPTION OF PREFERRED EMBODIMENTS

Figure 1:
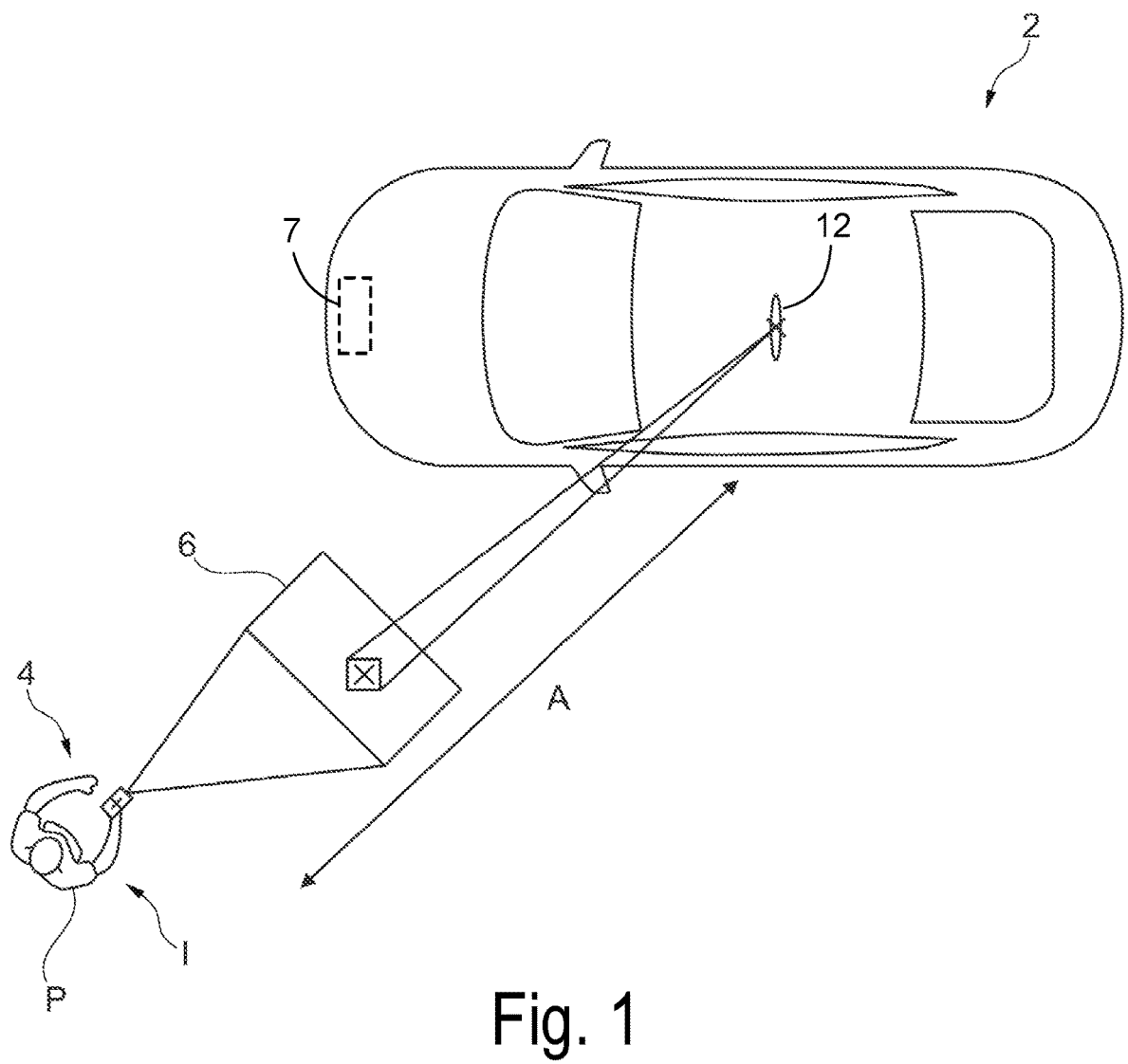
FIG. 1 shows a schematic depiction of a communication scenario in which a data record is transmitted from a motor vehicle to an HMI device outside the motor vehicle.

Reference is first of all made to FIG. 1 which depicts a motor vehicle 2, which is an automobile in the present exemplary embodiment. As a departure from the present exemplary embodiment, the motor vehicle may also be a truck or bus.

Further, the motor vehicle 2 in the present exemplary embodiment is designed as a self-driving, ride-share motor vehicle for highly automated or autonomous driving. In other words, the motor vehicle 2 can also be referred to as a robot car combined with a level 5 (full automation) of the classification for autonomous driving, wherein temporary use of the vehicle can be hired (e.g., purchased) by passengers on a trip-by-trip basis.

In this case, a level 5 motor vehicle is understood to mean a self-driving motor vehicle 2 using an automated driving system to continuously perform all aspects of the dynamic driving task historically handled by a human driver. Thus, the steering wheel, brake and accelerator pedals are typically not present.

The motor vehicle 2 has ambient sensors 7, such as LIDAR or radar sensors, that the motor vehicle 2 can use to scan its surroundings as known in the art of autonomous vehicle controls. From the information obtained, it can determine its position and that of other road users, head for a predetermined destination in collaboration with a piece of navigation software, and avoid collisions on the way.

Further, a potential passenger P is depicted who wishes to access the motor vehicle 2 for a journey.

In one hand, the passenger P holds an HMI device 4, which is designed as a handheld device (e.g. as a smartphone) operating a corresponding application program, in the present exemplary embodiment.

Figure 2:
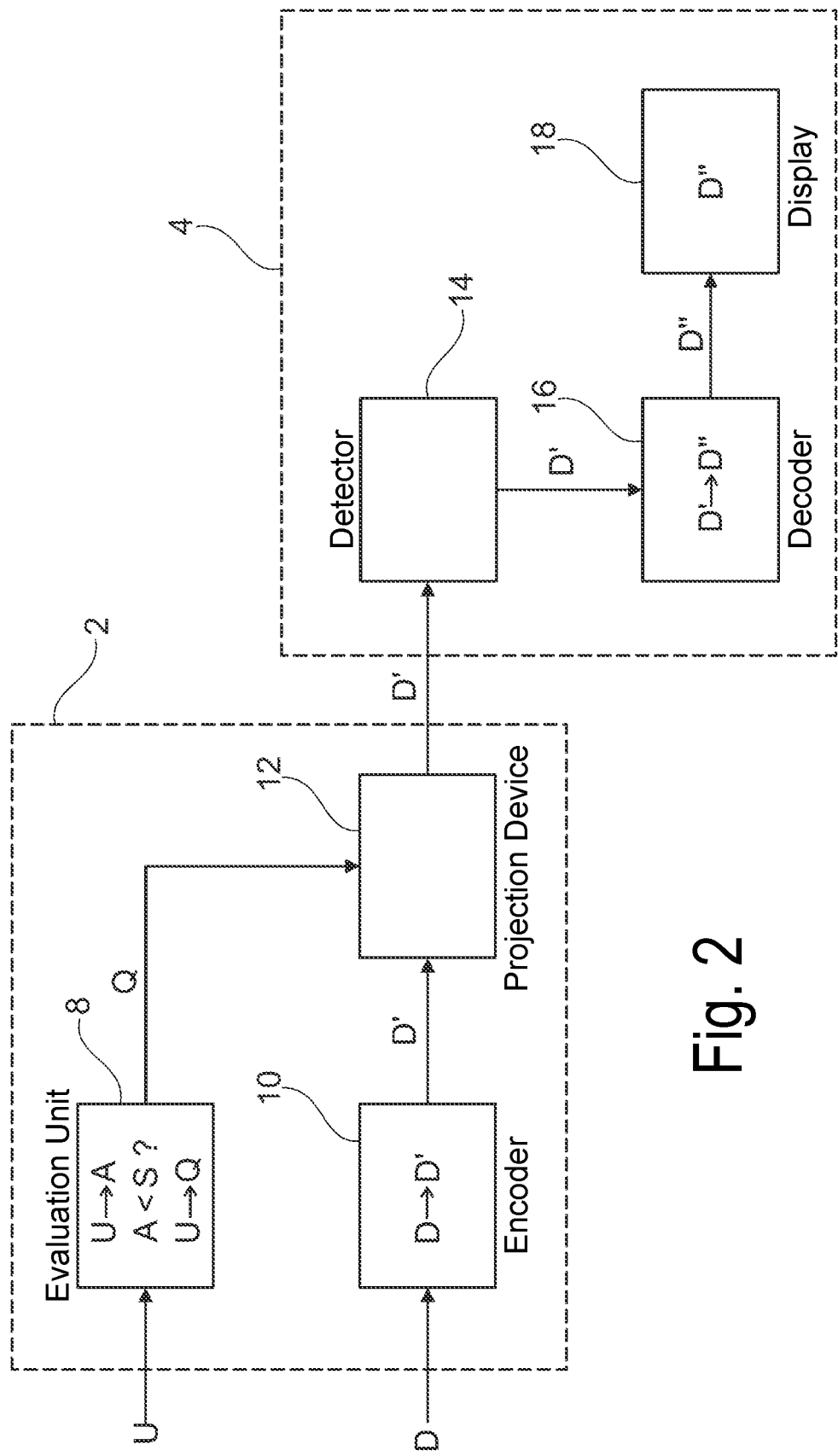
FIG. 2 shows a schematic depiction of components of the motor vehicle and HMI device depicted in FIG. 1.

Components of the motor vehicle 2 and of the HMI device 4 will now be explained with additional reference to FIG. 2.

The motor vehicle 2 has an evaluation unit 8, an encoding (i.e., enciphering) device 10, and a projection device 12.

The evaluation unit 8 is configured to read in and evaluate surroundings data U from surroundings data collected by sensors 7. The encoding device 10 can be used to convert a data record D into an encoded data record D', and the projection device 12 can be used to project the data record (D') encoded by the encoding device 10 onto a projection area 6.

In the present exemplary embodiment, the HMI device 4 has a reading-in device 14 (such as a camera), a decoding (i.e., deciphering) device 16, and a display device 18 (such as a display screen or a sound transducer).

The reading-in device 14 can be used to read in the projected data record D', and the decoding device 14 can be used to decode the read-in data record D' in order to obtain the decoded data record D", which can then be brought to the attention of the passenger P on the display device 18, e.g. in visual form as a text output on a screen of the HMI 4, so as to inform the passenger P about the booking status of the motor vehicle 2.

For these tasks and functions, both the motor vehicle 2 and the HMI device 4 can have applicable hardware and/or software components.

In one example operation of a shared autonomous vehicle described below, the motor vehicle 2 is unbooked and looking for a passenger P.

In a first step, the status data record D (providing the unbooked status information) is encoded in machine-readable fashion by the encoding device 10 of the motor vehicle 2, and the encoded data record D' is transmitted together with the projection data record Q to the projection device 12 of the motor vehicle 2.

The ambient sensors 7, such as the LIDAR sensors, are used by the motor vehicle 2 in a further step to detect the passenger P by evaluating ambient sensor data. Additionally or alternatively, GPS data and wireless communication networks, such as WiFi or Bluetooth, can be used for detecting the passenger P.

In a further step, the evaluation unit 8 evaluates the ambient sensor data U in order to determine a position data record representative of the position I of the HMI device 4 or of the passenger P in relation to the motor vehicle 2.

In a further step, the evaluation unit 8 evaluates the position data record in order to determine a distance A between the motor vehicle 2 and the HMI 4 or passenger P.

In a further step, the evaluation unit 8 compares the distance A with a predetermined threshold value S. If the distance A is less than the threshold value S, the data record D' is projected. If the distance A is greater than or equal to the threshold value S, however, the data record D' is not projected.

Before the data record D' is projected, however, a further step involves the evaluation unit 8 likewise evaluating the position data record in order to determine a projection data record Q representative of the projection area 6 that defines the region of the projection area 6 in the form of a set of coordinates. Expediently, the projection data record Q defines a projection area 6 located in a region between the motor vehicle and the HMI device 4.

In the present exemplary embodiment, the projection area 6 is a section of ground between the motor vehicle 2 and the HMI device 4 or the passenger P.

The projection device 12 evaluates the projection data record Q so as then to project the encoded data record D' into the predetermined projection area 6 outside the motor vehicle 2. To this end, in the present exemplary embodiment, a projection of light is effected with light in the visible wavelength range. The projected light pattern exhibits a spatial or temporal variation according to the encoded data.

The data record D' may be encoded using pulse width modulation (on/off pattern), frequency modulation (also resulting in different colors), amplitude modulation (resulting in changes of intensity), or geometric modulated (resulting in different shapes and/or positions of data elements).

In a further step, the HMI device 4 reads in the projected data record D' using the reading-in device (e.g., camera) 14 and forwards the read-in data record D' to the decoding device 16. The decoding device 16 decodes the read-in data record D' in order to obtain the deciphered data record D" and ascertains the situation, in the present example the "free" booking status of the motor vehicle 2, which is then reproduced in visual form as a text output on the display device 18 of the HMI device 4 or in audible form so as to inform the passenger P about the booking status of the motor vehicle 2. In response, the potential passenger P can initiate other steps and communication (e.g., via WiFi) in order to obtain access and use of vehicle 2.

As a departure from the present exemplary embodiment, the order of the steps could be other than as described.

There may also be provision for the passenger P to be actively searching for an unbooked (i.e., available) motor vehicle 2 during operation.

In this case, a first step involves the HMI device 4 of the passenger P sending a query signal to the motor vehicle 2, e.g., by means of WiFi or Bluetooth. On receiving such a query signal, the motor vehicle 2 detects the passenger P.

In a further step, the data record D is now encoded in machine-readable fashion by the encoding device 10 of the motor vehicle 2, and the encoded data record D' is transmitted together with the projection data record Q to the projection device 12 of the motor vehicle 2.

The ambient sensors, such as the LIDAR sensors, are used by the motor vehicle 2 in a further step to detect the passenger P by evaluating ambient sensor data. Additionally or alternatively, GPS data and wireless communication networks, such as WiFi or Bluetooth, can be used for detecting the passenger P.

In a further step, the evaluation unit 8 evaluates the ambient sensor data U in order to determine the position data record representative of the position I of the HMI device 4 or of the passenger P in relation to the motor vehicle 2.

In a further step, the evaluation unit 8 evaluates the position data record in order to determine the distance A between the motor vehicle 2 and the HMI device 4 or passenger P.

In a further step, the evaluation unit 8 compares the distance A with the predetermined threshold value S. If the distance A is less than the threshold value S, the data record D' is projected. If the distance A is greater than or equal to the threshold value S, however, the data record D' is not projected.

Before the data record is projected, however, a further step involves the evaluation unit 8 likewise evaluating the position data record in order to determine the projection data record Q representative of the projection area 6 that defines the region of the projection area 6 in the form of a set of coordinates. Expediently, the projection data record Q defines a projection area 6 located in a region between the motor vehicle and the HMI device.

In the present exemplary embodiment, the projection area 6 is a section of ground between the motor vehicle 2 and the HMI 4 or the passenger P.

The projection device 12 evaluates the projection data record Q so as then to project the encoded data record D' into the predetermined projection area 6 outside the motor vehicle 2. To this end, in the present exemplary embodiment, a projection of light is effected with light in the visible wavelength range.

The data record D' may be pulse width modulated (on/off pattern), frequency modulated (also resulting in different colors), amplitude modulated (resulting in changes of intensity), or geometrically modulated (resulting in different shapes and/or positions).

In a further step, the HMI device 4 reads in the projected data record D' using the reading-in device 14 and forwards the read-in data record D' to the decoding device 16. The decoding device 16 decodes the read-in data record D' in order to obtain the decoded data record D" and ascertains the situation, in the present case the "free" booking status of the motor vehicle 2, which is then reproduced in visual form as a text output on the display device 18 of the HMI device 4 or in audible form so as to inform the passenger P about the booking status of the motor vehicle 2.

As a departure from the present exemplary embodiment, the order of the steps may also be different in this case too.

Further, there may be provision for the passenger P and/or the motor vehicle 2 to move and thus change their respective positions. This is continuously detected by motor vehicle 2, and a new projection data record Q determines an updated projection area 6. In this case, there may be provision for the projection area 6 to be determined such that it remains the same for the passenger P—whether he is now standing still or is himself moving. That is to say that the passenger P does not have to change or adapt the orientation of the HMI device 4 in order to continue to read in the projected data record.

In addition, there may be provision for a stationary motor vehicle 2 (e.g., a parked motor vehicle 2) to have the projection area 6 arranged on the side of the motor vehicle 2 on which the passenger P usually gets into the motor vehicle 2 (e.g., the driver's side), regardless of the position I of the passenger P. Alternatively, the projection area 6 may be arranged, regardless of the position I of the passenger P, on the side of the motor vehicle 2 on which the passenger P usually passes the motor vehicle 2.

Figure 3:
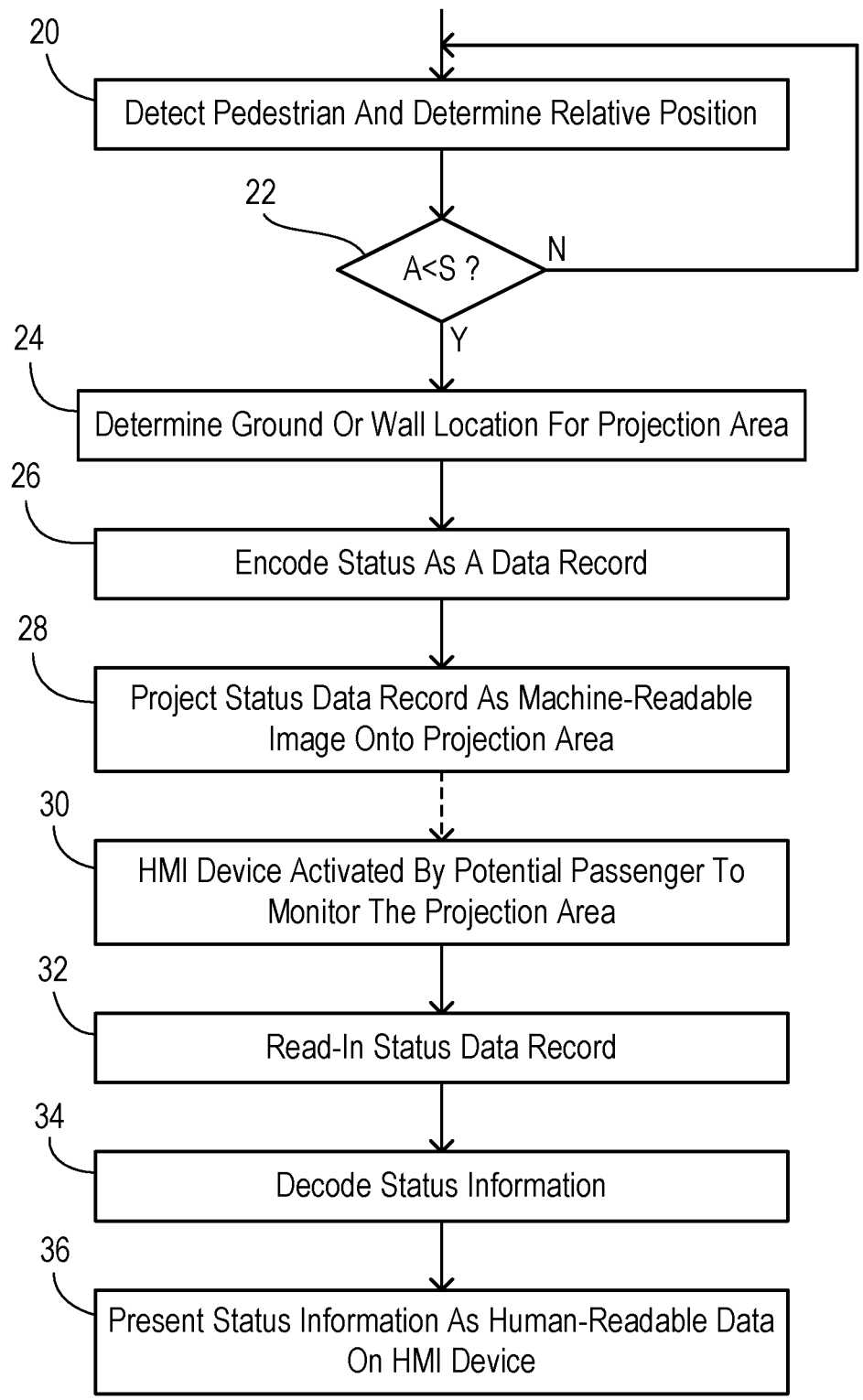
FIG. 3 shows a flowchart depiction of one embodiment of a method of the invention.

FIG. 3 depicts a general method of the invention wherein a pedestrian (representing a potential passenger) having an HMI device is detected in the vicinity of the ride-share vehicle and a relative position is determined in step 20. Based on the relative position, a distance between the HMI device and the ride-share vehicle is compared to a threshold value S in step 22. If greater than the threshold S, then a return is made to step 20. When distance A is less than the threshold S, then the surroundings data is evaluated in step 24 to determine a section of ground or another flat surface or wall location to be used as the projection area. In step 26, the ride-share status information is encoded as the status data record. In step 28, the status data record is projected as a machine-readable image onto the projection area by the projection device.

As the projection of the status data record proceeds, the HMI device is activated by the potential passenger in step 30 to monitor the projection area. In step 32, the encoded status data record is read-in by the HMI device. The status information is decoded in step 34, and the status information is presented as human-readable data on the HMI device in step 36.

As such, it is a simple matter for a data record indicative of the booking status of the motor vehicle 2 to be transmitted from the motor vehicle to the HMI of a potential passenger.

What is claimed is:

1. A method for transmitting a status data record from an autonomous ride-share vehicle to an HMI device outside the ride-share vehicle, wherein the status data record encodes a ride-share status information of the ride-share vehicle, the method comprising the steps of:
    projecting the status data record as a machine-readable projected image onto a projection area outside the vehicle using a projection device of the vehicle;
    reading-in the projected status data record using a reading device of the HMI device by capturing the projected image;
    decoding the read-in data record to recover the ride-share status information; and
    presenting the ride-share status information on the HMI device in human-readable form.

2. The method of claim 1 wherein the projection area is comprised of a section of ground between the HMI device and the ride-share vehicle.

3. The method of claim 1 further comprising the step of determining a position data record representative of a relative position of the HMI device to the ride-share vehicle.

4. The method of claim 3 further comprising the step of:
    evaluating the position data record to determine a distance between the ride-share vehicle and the HMI device;
    wherein the status data record is projected only if the distance is less than a threshold value.

5. The method of claim 3 further comprising the steps of:
    determining a projection data record defining a location for the projection area in response to evaluating the position data record.

6. The method of claim 1 wherein an encoding device of the ride-share vehicle encodes the status data record to be projected in machine-readable form and a decoding device of the HMI device decodes the projected status data record encoded in machine-readable form.

7. A ride-share vehicle comprising:
    an encoder receiving ride-share status information and encoding the information status into a machine-readable status data record;
    an evaluation unit detecting an HMI device of a potential passenger outside the ride-share vehicle and selecting a projection area between the ride-share vehicle and the HMI device; and
    a projection device illuminating the projection area according to the status data record.

8. The ride-share vehicle of claim 7 wherein the projection area is comprised of a section of ground between the ride-share vehicle and the HMI device.

9. The ride-share vehicle of claim 7 wherein the evaluation unit determines a position data record representative of a position of the HMI relative to the ride-share vehicle.

10. The ride-share vehicle of claim 7 wherein the evaluation unit determines a distance between the ride-share vehicle and the HMI device, and wherein the projection device projects the status data record onto the projection area only if the distance is less than a threshold value.

11. The ride-share vehicle claim 7 wherein the projection device is comprised of a light source.

12. The ride-share vehicle of claim 11 wherein the light source projects the encoded status data record in visible light with a modulation detectable by a receiving camera.

13. A ride-share vehicle of claim 7 wherein the evaluation unit is comprised of a LIDAR sensor.

* * * * *